United States Patent
Park

(10) Patent No.: US 8,638,459 B2
(45) Date of Patent: Jan. 28, 2014

(54) IMAGE FORMING APPARATUS TO SUPPORT WIRED AND WIRELESS NETWORK INTERFACES AND NETWORK CONNECTION METHOD OF THE IMAGE FORMING APPARATUS

(75) Inventor: Hyun-wook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 12/730,488

(22) Filed: Mar. 24, 2010

(65) Prior Publication Data

US 2011/0080609 A1 Apr. 7, 2011

(30) Foreign Application Priority Data

Oct. 1, 2009 (KR) ........................ 10-2009-0094053

(51) Int. Cl.
*G06F 15/00* (2006.01)

(52) U.S. Cl.
USPC ............................ 358/1.15; 358/440; 358/442

(58) Field of Classification Search
USPC ........ 358/1.1, 1.13, 1.15, 400, 401, 434, 435, 358/436, 438, 439, 440, 442, 468
See application file for complete search history.

(56) References Cited

U.S. PATENT DOCUMENTS 6,493,104 B1 * 12/2002 Cromer et al. ................ 358/1.15
2005/0099962 A1 * 5/2005 Matsuda ....................... 370/254

* cited by examiner

*Primary Examiner* — Thomas D Lee
(74) *Attorney, Agent, or Firm* — Stanzione & Kim, LLP

(57) ABSTRACT

A network connection method of an image forming apparatus to support wired and wireless network interfaces includes receiving a destination address, attempting to connect to a destination corresponding to the destination address by using each of the wired and wireless network interfaces, determining a network interface connectable to the destination, according to a result of the attempt, and transmitting data to the destination by using the connectable network interface.

28 Claims, 11 Drawing Sheets

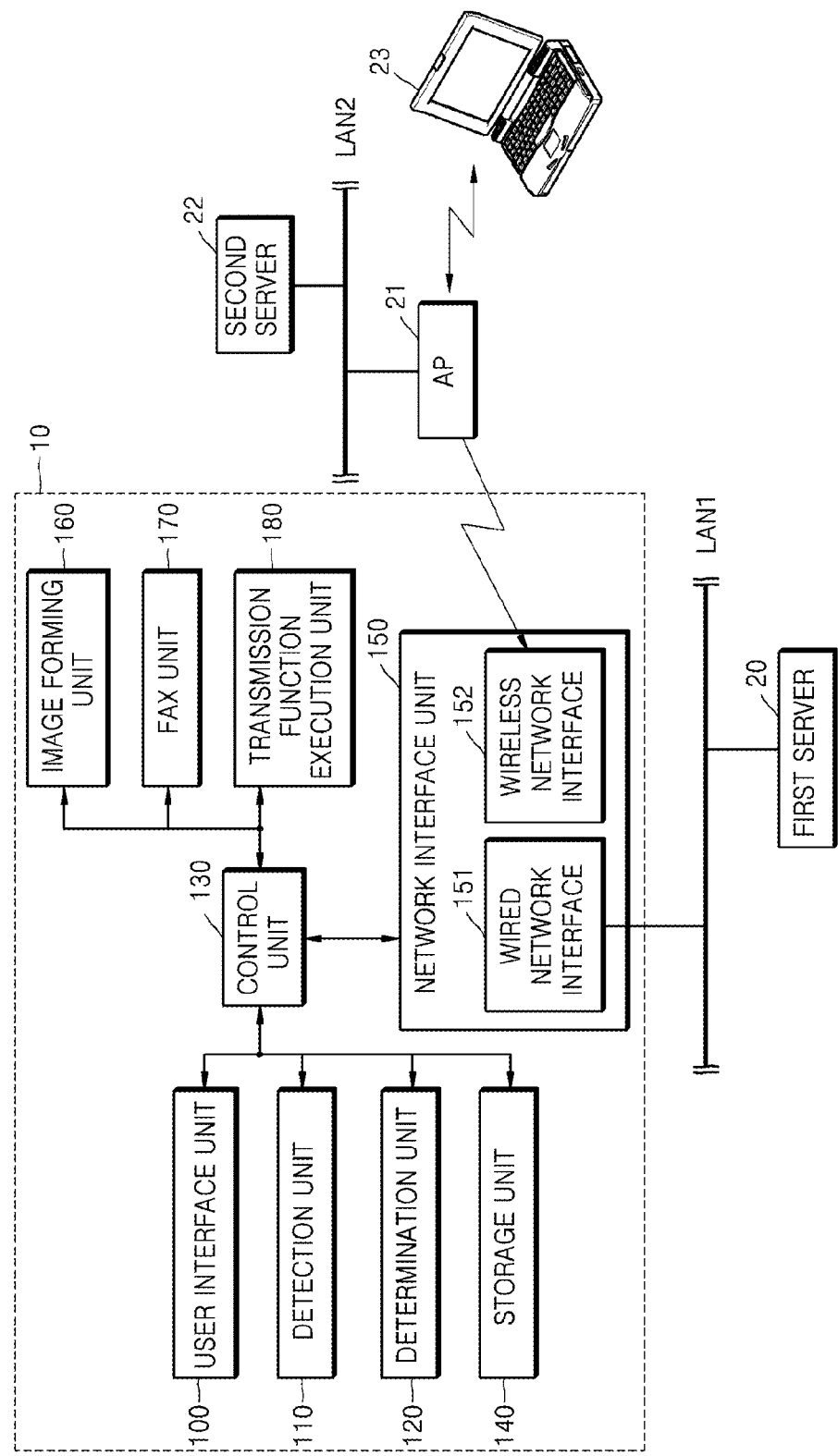

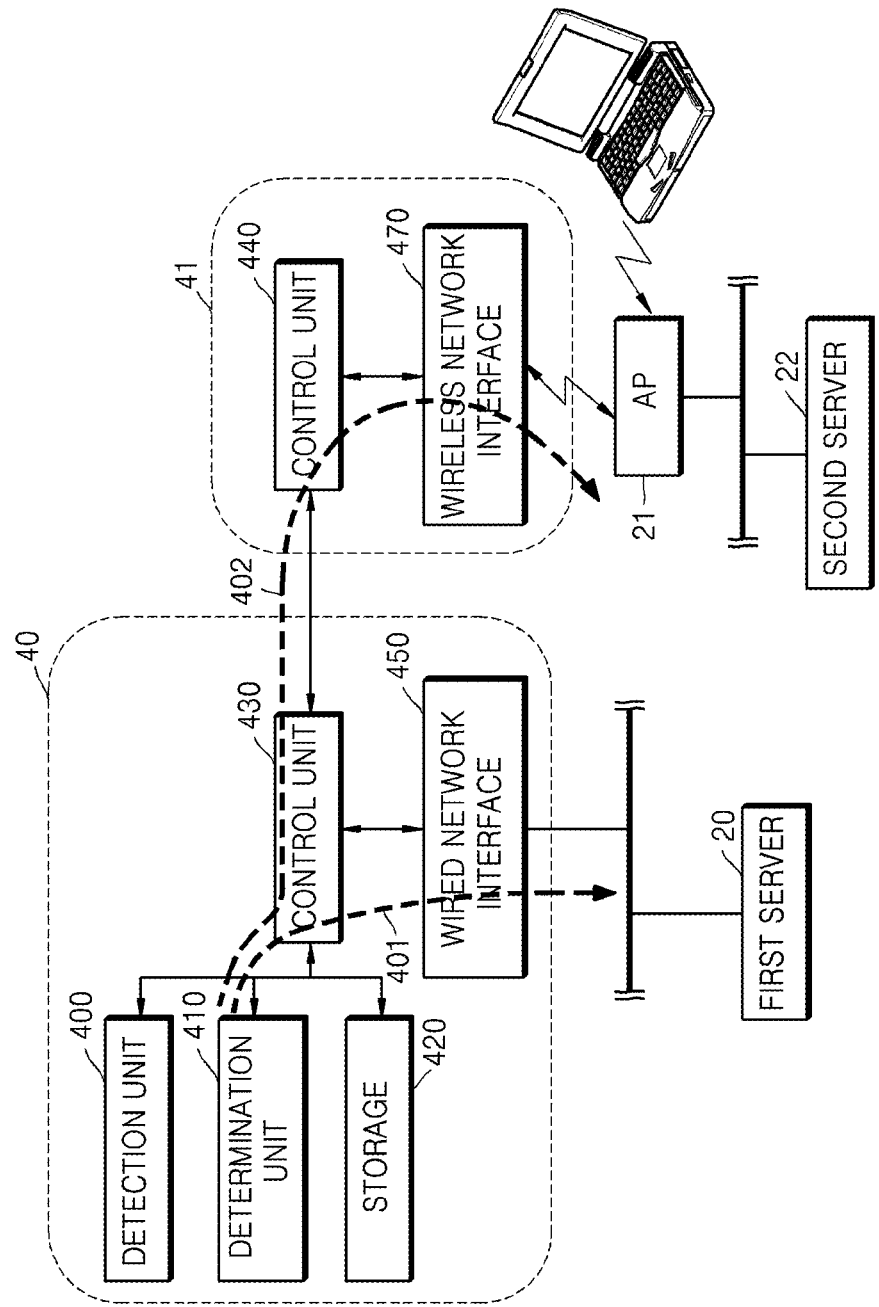

IMAGE FORMING APPARATUS TO SUPPORT WIRED AND WIRELESS NETWORK INTERFACES AND NETWORK CONNECTION METHOD OF THE IMAGE FORMING APPARATUS

CROSS-REFERENCE TO RELATED APPLICATIONS

This application claims priority under 35 U.S.C. §119 of Korean Patent Application No. 10-2009-0094053, filed on Oct. 1, 2009, in the Korean Intellectual Property Office, the disclosure of which is incorporated herein in its entirety by reference.

BACKGROUND

1. Field of the Invention

The present general inventive concept relates to an image forming apparatus to support wired and wireless network interfaces and a network connection method of the image forming apparatus.

2. Description of the Related Art

Image forming apparatuses include office automation devices such as a multi-function product (MFP) capable of performing functions of a printer, a copying machine, a scanner, a fax machine, etc., which are often used in offices. Currently, devices such as a printer, a scanner, a copying machine and a fax machine are widespread, and use of MFPs to integrally perform functions of those devices is increasing. An example of the MFPs may be an MFP to support a document transfer function through a network. For example, to perform a scanning function from among various functions of an MFP, the MFP may scan a document so as to generate scanning data and may transmit the generated scanning data to a wired network.

SUMMARY

The present general inventive concept provides an image forming apparatus to support wired and wireless network interfaces and a network connection method of the image forming apparatus.

Additional aspects and utilities of the present general inventive concept will be set forth in part in the description which follows and, in part, will be obvious from the description, or may be learned by practice of the general inventive concept.

Features and/or utilities of the present general inventive concept may be realized by a network connection method of an image forming apparatus to support wired and wireless network interfaces connectable to an external device, the method including receiving a destination address to which job data stored in the image forming apparatus is to be transmitted, attempting to connect to a destination corresponding to the destination address by using each of the wired and wireless network interfaces, determining a network interface connectable to the destination, according to a result of the attempt, and transmitting the job data to the destination by using the connectable network interface.

Features and/or utilities of the present general inventive concept may also be realized by a computer readable recording medium having recorded thereon a computer program to execute a network connection method of an image forming apparatus to support wired and wireless network interfaces connectable to an external device, the method including receiving a destination address to which job data stored in the image forming apparatus is to be transmitted, attempting to connect to a destination corresponding to the destination address by using each of the wired and wireless network interfaces, determining a network interface connectable to the destination, according to a result of the attempt, and transmitting the job data to the destination by using the connectable network interface.

Features and/or utilities of the present general inventive concept may also be realized by an image forming apparatus to support wired and wireless network interfaces connectable to an external device, the image forming apparatus including a user interface unit to receive a destination address to which job data stored in the image forming apparatus is to be transmitted, a network interface unit including at least one of wired and wireless network interfaces, a control unit to control the network interface unit to attempt to connect to a destination corresponding to the destination address by using each of the wired and wireless network interfaces, a determination unit to determine a network interface connectable to the destination, according to a result of the attempt, and a storage to store data including the job data, wherein the control unit controls the network interface unit to transmit the job data to the destination by using the connectable network interface.

Features and/or utilities of the present general inventive concept may also be realized by a network connection method including receiving a command at an image-forming apparatus to transmit data to a destination address, querying the destination address via at least two network interfaces, and upon receiving an acknowledgement to the query via at least one of the network interfaces, transmitting the data via the at least one network interface.

A first network interface of the at least two network interfaces may be a wired network interface and a second network interface of the at least two network interfaces may be a wireless network interface.

The method may further include determining whether the at least two network interfaces received acknowledgements to the query and determining a preferred network interface of the at least to network interfaces to transmit the data.

Determining a preferred network interface may include comparing network characteristics of respective networks connecting the at least two network interfaces to the destination address.

The method may include storing mapping information regarding a network connecting the at least one network interface having received the acknowledgement and the destination address.

The network connection method may include, upon receiving the command to transmit data, determining whether mapping information of a network connected to the destination address is stored in the image-forming apparatus.

Features and/or utilities of the present general inventive concept may also be realized by an image-forming apparatus, including at least two network interfaces, each connectable to a separate network external to the image-forming apparatus, and a controller to receive a command to transmit data to a destination address, to transmit a query corresponding to the destination address via each of the at least two network interfaces, and to control a first network interface of the at least two network interfaces to transmit the data to the destination address when an acknowledgement is received corresponding to the destination address via the first network interface.

At least one of the network interfaces may be a wired network interface and at least another of the network interfaces may be a wireless network interface.

The image forming apparatus may further include a user interface to receive the command to transmit data to the destination address.

The image forming apparatus may further include a determination unit controllable by the control unit to determine whether one of the at least two network interfaces has received an acknowledgement.

The determination unit may determine whether each of the at least two network interfaces has received an acknowledgement in response to a query and determines a preferred network interface of the at least two network interfaces.

The determination unit may determine a preferred network by analyzing at least one network characteristic.

Features and/or utilities of the present general inventive concept may also be realized by an image-forming system including a first network including at least a first network server, a second network including at least a second network server and a wireless access point, and an image-forming apparatus connected to the first network via a wired connection and wirelessly connected to the second via the wireless access point. The image-forming apparatus may include a first network interface connected to the first network, a second network interface connected to the second network, and a controller to receive a command to transmit data to a destination address, to transmit a query corresponding to the destination address via each of the network interfaces, and to control one of the first and second network interfaces to transmit the data to the destination address when an acknowledgement is received corresponding to the destination address via one of the first and second network interfaces.

BRIEF DESCRIPTION OF THE DRAWINGS

The above and other features and advantages of the present general inventive concept will become more apparent by describing in detail exemplary embodiments thereof with reference to the attached drawings in which:

FIG. 2 is a detailed block diagram of an image forming apparatus in the image forming system illustrated in FIG. 1, according to an embodiment of the present general inventive concept;

FIGS. 4A and 4B are diagrams illustrating a network connection method of an image forming apparatus by using an external device, according to an embodiment of the present general inventive concept;

DETAILED DESCRIPTION OF THE EMBODIMENTS

Figure 1:
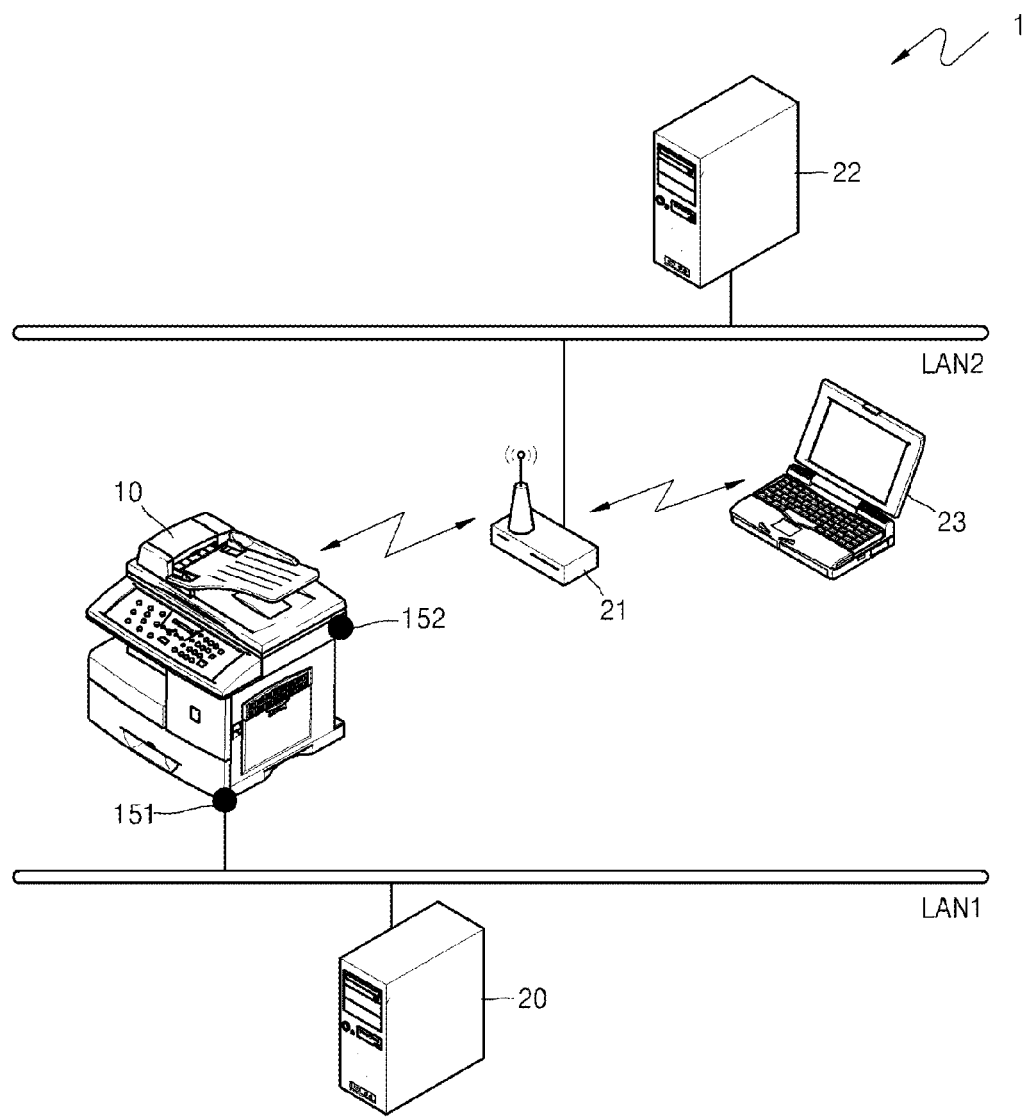
FIG. 1 is a structural diagram of an image forming system, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a structural diagram of an image forming system 1, according to an embodiment of the present general inventive concept.

Referring to FIG. 1, the image forming system 1 includes an image forming apparatus 10, a first server 20, an access point (AP) 21, a second server 22 and a notebook computer 23. The image forming apparatus 10 includes a wired network interface 151 and a wireless network interface 152. The wired network interface 151 supports access to a wired network and the wireless network interface 152 supports access to a wireless network. Here, each of the first and second servers 20 and 22 may be a file transfer protocol (FTP) server, a server message block (SMB) server, or an e-mail management server.

In more detail, the wired network interface 151 is connected to and may communicate with a local area network (LAN) 1 by wire. The LAN 1 is connected to the first server 20 by wire. Accordingly, the wired network interface 151 may access and communicate with the first server 20 by wire. The wireless network interface 152 is connected to and may communicate with the access point 21 wirelessly. Also, the access point 21 may be a wireless access point (WAP). The access point 21 as a WAP may be a wireless communication device for connecting a wireless network such as a wireless LAN, Wi-Fi or Bluetooth. The access point 21 is connected to a LAN 2 by wire. Since the second server 22 is connected to the LAN 2 by wire, the access point 21 may access and communicate with the second server 22 by wire. Also, the access point 21 is connected to and may communicate with devices such as the notebook computer 23 wirelessly. Accordingly, the wireless network interface 152 may communicate with devices such as the second server 22 and the notebook computer 23 via the access point 21. Although only one notebook computer 23 is illustrated in FIG. 1, a plurality of notebook computers or a plurality of other devices that may communicate wirelessly may be connected to and communicate with the wireless network interface 152 via the access point 21.

FIG. 2 is a detailed block diagram of the image forming apparatus 10 in the image forming system 1 illustrated in FIG. 1, according to an embodiment of the present general inventive concept. FIG. 2 will be described in conjunction with FIG. 1.

Referring to FIG. 2, the image forming apparatus 10 includes a user interface unit 100, a detection unit 110, a determination unit 120, a control unit 130, a storage unit 140, a network interface unit 150, an image forming unit 160, a fax unit 170, and a transmission function execution unit 180. The network interface unit 150 includes the wired and wireless network interfaces 151 and 152. The elements of the image forming apparatus 10 may be located on different boards or different chips. Also, some or all of the elements may be located on one board or one chip as a system on a chip (SOC).

The user interface unit 100 may include one or more displays and input devices, including buttons, touch-screens, dials, knobs, or any other input. In addition, the user interface may include connections to connect to external devices to interface with the image-forming apparatus 10. The user interface unit 100 may include one or more processors, logic chips, memory, and passive electronic devices to operate the displays and input devices. Alternatively, the user interface unit 100 may include software executable by the control unit 130 to operate the displays and input devices.

The detection unit 110 and determination unit 120 may each include one or more processors, logic chips, memory, and passive electrical devices to perform the detection and determination functions, as described below. The detection unit 110 and determination unit 120 may have dedicated hardware, or may share hardware with each other and other functional units of the image-forming apparatus 10. In addition, the detection unit 110 and the determination unit 120 may include software stored in memory and executable by the control unit 130 to perform the detection and determination functions.

The storage unit 140 may include one or more memory chips accessible by the control unit 130, or it may include portions of memory of the control unit 130 dedicated to data storage. For example, the control unit 130 may include one or more memory chips having portions dedicated to controlling user interface displays, detection functions, determination functions, and data storage functions.

The network interface unit 150 may include one or more circuits or network interfaces 151, 152 including ports to connect to external networks. The ports may include wired ports or transceivers to wirelessly transmit and receive data. The network interfaces 151, 152 may be located on a same circuit board or different circuit boards, may be mounted within a housing of the image-forming apparatus 10, or may be connected to a port outside the housing of the image-forming apparatus 10. The network interface unit 150 may include any combination of processors, logic chips, memory, and passive electronic devices to allow communication between the control unit 130 and external networks, such as LAN1 and LAN2.

The image forming unit 160 and fax unit 170 may include known means to scan, print, and copy media, including conductive rollers, and light emitting, receiving, and detecting devices. The image forming unit 160 and fax unit 170 may share hardware components or may have dedicated hardware components.

The transmission function execution unit 180 may include at least one processor, logic chip, memory, and passive electronic devices to allow the image-forming apparatus 10 to transmit or receive data to and from external devices. For example, if a document is scanned into the image-forming apparatus, the controller 130 may control the transmission function execution unit 180 to prepare the data corresponding to the scanned document to be transmitted via one of the network interfaces 151, 152. The transmission function execution unit 180 may also include software stored in memory accessible by the control unit 130 to perform the transmission function.

The control unit 130 may include any combination of processors, logic chips, memory, and passive electronic devices. Each functional unit of the image-forming apparatus 10 may include software code stored in memory of the control unit 130 or memory accessible by the control unit 130, or each functional unit may include separate hardware controllable by the control unit 130.

In order to prevent unclear descriptions on the current embodiment, only elements regarding the features of the current embodiment will be described. Accordingly, it will be understood by those of ordinary skill in the art that other general-use elements may be further included in addition to the elements illustrated in FIG. 2.

The image forming apparatus 10 is connected to at least one host device by wire or wirelessly via the network interface unit 150 and may be a general multi-function product (MFP) to support one or more functions from among data transmitting to a server, copying, faxing, printing, e-mailing, and scanning. Generally, an MFP may store job data generated when any of functions supported is performed into a storage in the MFP, and may perform data transmitting to a server, faxing, printing, or e-mailing with respect to the stored job data at a user's desired time.

The image forming apparatus 10 as an MFP may perform a scanning function or a printing function of data in a file format. The image forming apparatus 10 according to the current embodiment may store job data generated when either of the functions supported is performed. Here, the job data may be data scanned by the image forming apparatus 10 or data previously stored in the image forming apparatus 10. The stored data may be printing data, fax data, e-mail data, or transmission data transmitted from a host device connected to the image forming apparatus 10.

The job data may be transmitted to an external destination via the network interface unit 150 included in the image forming apparatus 10. If the network interface unit 150 supports the wired network interface 151, the job data may be transmitted to a wired destination, and if the network interface unit 150 supports the wireless network interface 152, the job data may be transmitted to a wireless destination. Accordingly, if the network interface unit 150 included in the image forming apparatus 10 supports both the wired and wireless network interfaces 151 and 152, the image forming apparatus 10 may transmit the job data to a destination in a wired network or a wireless network.

The network interface unit 150 may include the wired and wireless network interfaces 151 and 152. In more detail, the network interface unit 150 may include at least one of the wired and wireless network interfaces 151 and 152 having different addresses. The wired network interface 151 supports access to a wired network and the wireless network interface 152 supports access to a wireless network. Each of the wired and wireless network interfaces 151 and 152 may be formed as an on-board interface or a network card. Also, the wired and wireless network interfaces 151 and 152 may be located on one network board.

In the current embodiment, the wired and wireless network interfaces 151 and 152 use different hardware addresses, for example, different media access control (MAC) addresses, and use different software addresses, for example, different Internet protocol (IP) addresses. A MAC address is a hardware address of an Ethernet card, which is a type of network interface card, and is recorded in a read only memory (ROM) of the Ethernet card. Since the wired and wireless network interfaces 151 and 152 use different MAC addresses, even when one of the wired and wireless network interfaces 151 and 152 performs a network-related operation, the other one of the wired and wireless network interfaces 151 and 152 may also perform a network-related operation. According to another embodiment of the present general inventive concept, the wired and wireless network interfaces 151 and 152 may use the same IP address.

The user interface unit 100 may receive a destination address to which the job data stored in the image forming apparatus 10 is to be transmitted. The destination address may include an FTP server address, an SMB server address, an e-mail address, an IP address and the like. The FTP server address, the SMB server address, the e-mail address, the IP address and the like may be managed by using an address book. The address book may include a list of information including information regarding destinations previously stored by a user, such as names, IP addresses, and web addresses of the destinations, and information regarding network interfaces mapped to the destinations.

The user interface unit 100 may receive information from the user by using any information input devices and methods, such as a keyboard, a mouse, a touch screen, voice recognition or the like. That is, the user interface unit 100 may receive the destination address directly from the user or by using the address book including the destination address and information regarding a network interface mapped to the destination address. If the user interface unit 100 receives the destination address by using the address book, the control unit 130 may control the network interface unit 150 to transmit the job data by using the network interface mapped to the destination address stored in the address book. However, if the destination address is received directly from the user, the control unit 130 may control the network interface unit 150 to attempt to connect to a destination corresponding to the destination address.

In more detail, if the user inputs the destination address directly to the user interface unit 100, then, for example, a list of destinations such as 'scan to FTP' and 'scan to SMB' may be displayed on the user interface unit 100. The user may select a destination from the list and input a detailed destination address.

Figure 6:
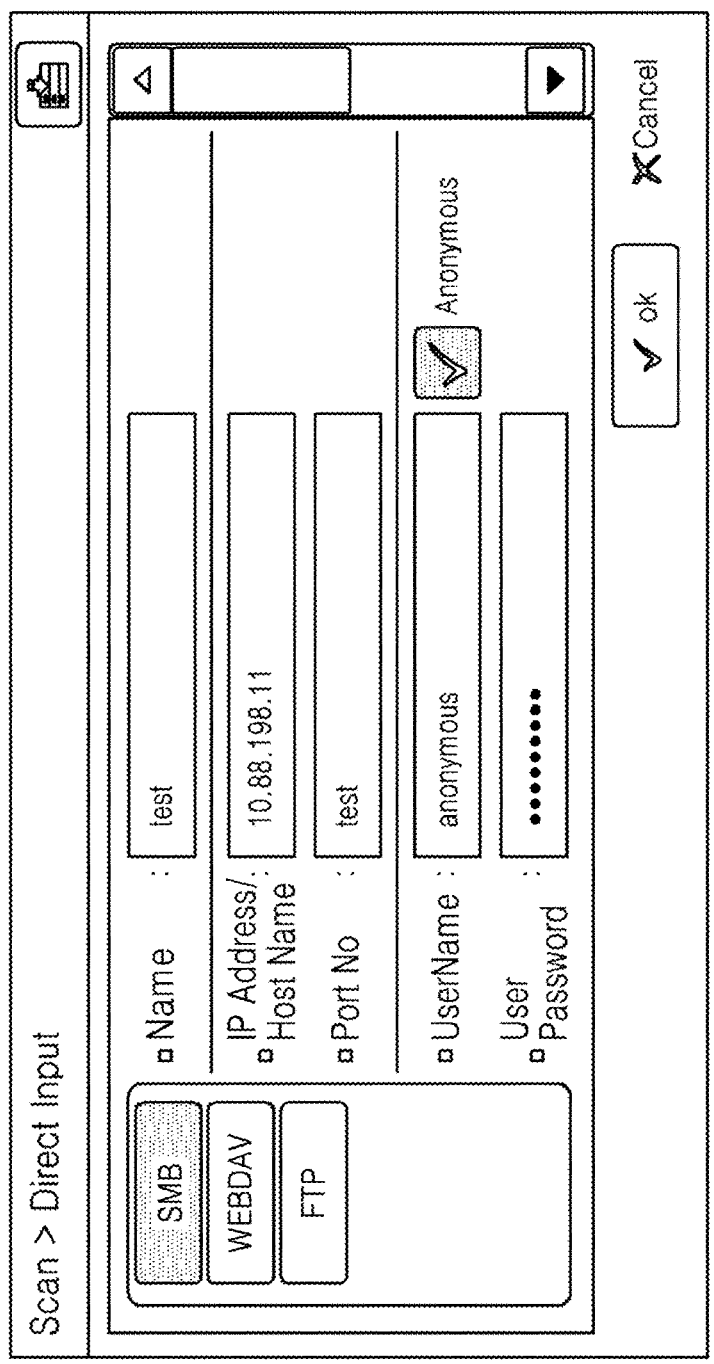
FIG. 6 is an image of a display screen of a user interface unit of the image forming apparatus illustrated in FIG. 2, according to an embodiment of the present general inventive concept.

FIG. 6 is an image of a display screen of the user interface unit 100 illustrated in FIG. 2, according to an embodiment of the present general inventive concept.

Referring to FIG. 6, if a user selects 'scan to SMB' from a list of destinations, the user may input a user name, a user password, a name of a destination address, an IP address of an SMB server and the like as information for connecting to a destination address. The IP address of the SMB server may be input in an Internet protocol version 4 (IPv4) format of 32 bits, e.g., 192.168.2.12 or 211.198.169.4. Here, the IP address in the IPv4 format is divided into four byte groups that are separated by using a period ("."). The destination address may be stored in the storage unit 140 illustrated in FIG. 2.

Figure 7:
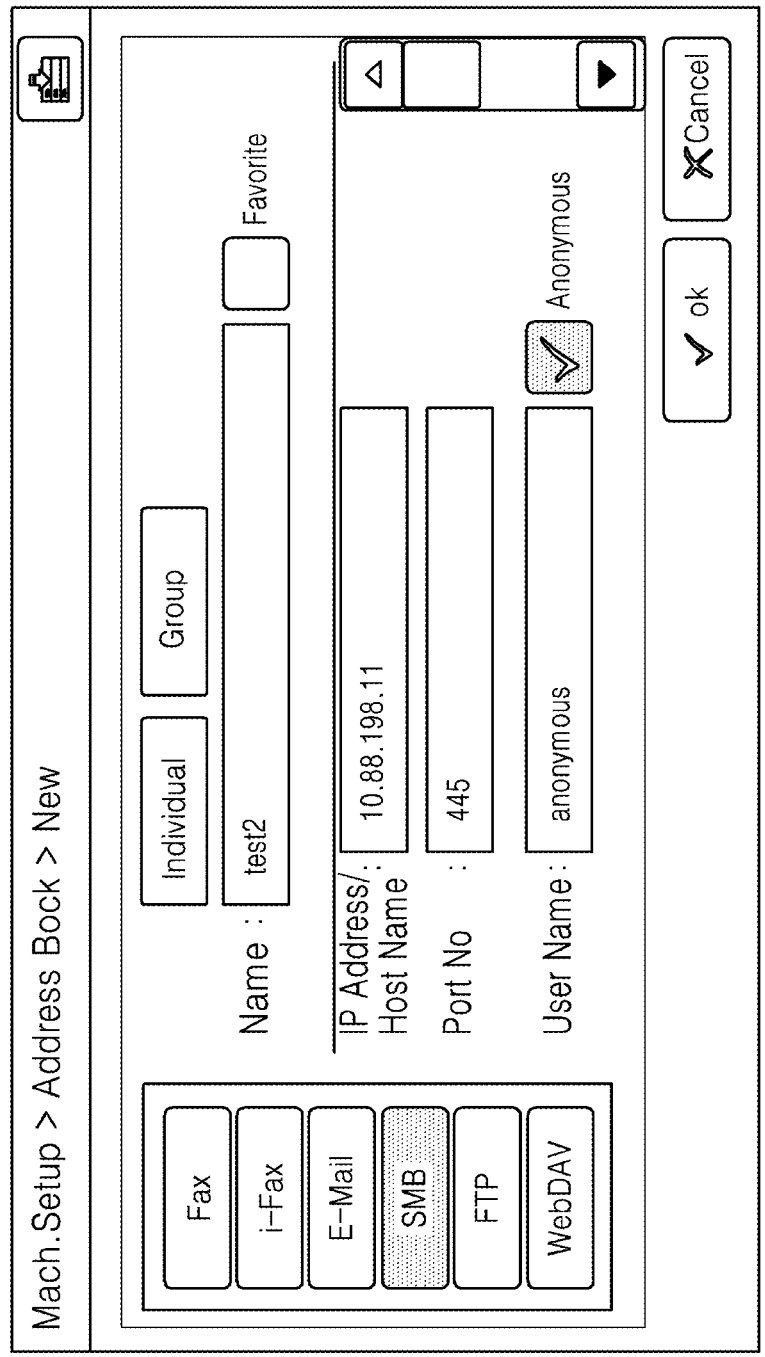
FIG. 7 is an image of a display screen of a user interface unit of the image forming apparatus illustrated in FIG. 2, according to another embodiment of the present general inventive concept.

FIG. 7 is an image of a display screen of the user interface unit 100 illustrated in FIG. 2, according to another embodiment of the present general inventive concept.

Referring to FIG. 7, a user may add a destination address into an address book. That is, the address book includes a list of destinations such as an FTP server, an SMB server, an e-mail address and the like. If the user selects the SMB server from the list of destinations, the user may input a user name, a name of the destination address, an IP address of the SMB server and the like as information for connecting the destination address. The input destination address may be stored in the storage unit 140 illustrated in FIG. 2.

Referring back to FIG. 2, the user may input the destination address using any of various methods, for example, by using a number keypad or a touch screen of the user interface unit 100.

As described above, the user may input the destination address directly to the user interface unit 100 or may also select a destination from the list of the address book. That is, the user may select a destination from among an e-mail address, an SMB server, and an FTP server listed in the address book. In more detail, if the user selects the e-mail address, then a list of e-mail addresses may be displayed and then the user may select a desired e-mail address from the list of e-mail addresses displayed on the user interface unit 100. Here, the e-mail addresses listed may correspond to addresses previously set when the image forming apparatus 10 is manufactured, or addresses previously used by the user and stored in the address book.

Figure 8:
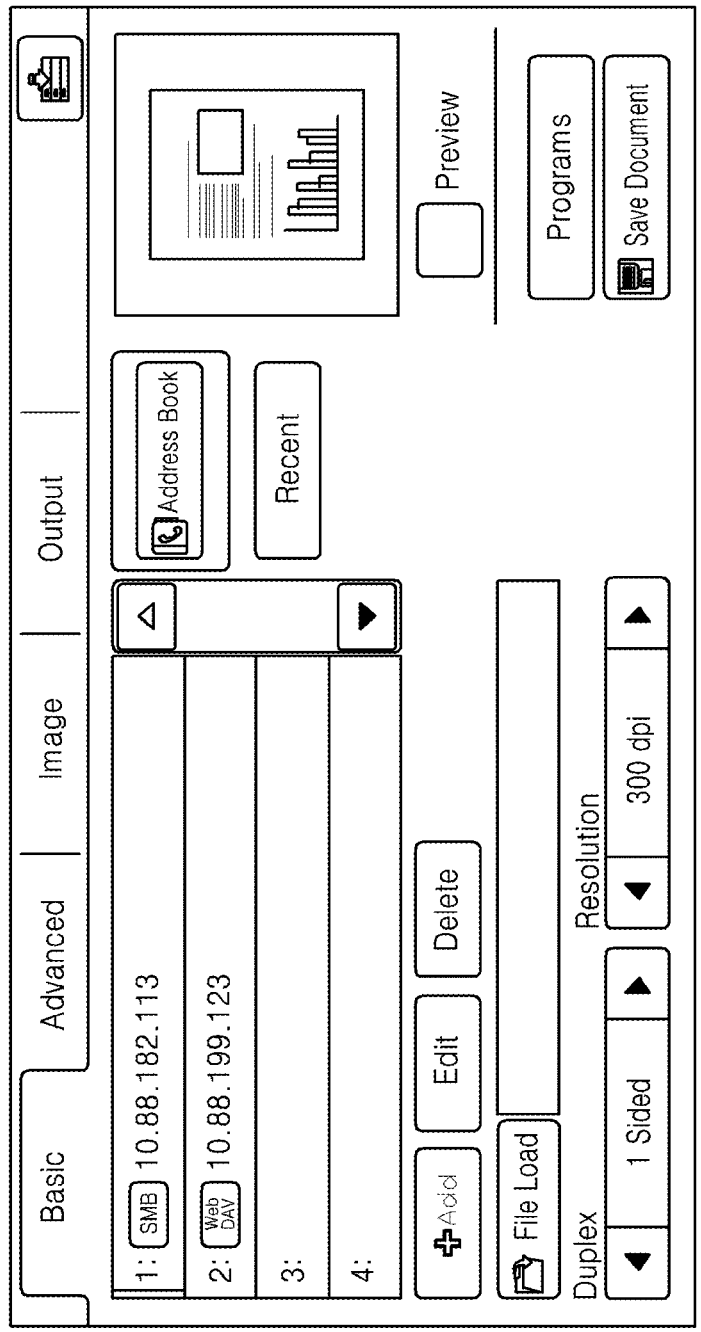
FIG. 8 is an image of a display screen of a user interface unit of the image forming apparatus illustrated in FIG. 2, according to another embodiment of the present general inventive concept.

FIG. 8 is an image of a display screen of the user interface unit 100 illustrated in FIG. 2, according to another embodiment of the present general inventive concept.

Referring to FIG. 8, a user may select a destination address from an address book. If the user selects '10.88.182.113', i.e., an address of an SMB server, from a list of the address book, the control unit 130 illustrated in FIG. 2 may control the network interface unit 150 illustrated in FIG. 2 to transmit job data by using a network interface mapped to the destination address.

Referring back to FIG. 2, if the destination address is received directly from the user, before the control unit 130 controls the network interface unit 150 to attempt to connect to the destination, the detection unit 110 may detect whether information regarding the network interface mapped to the destination address is stored in the address book. If the information is stored in the address book, the control unit 130 may control the network interface unit 150 to transmit the job data to the destination by using the network interface represented by the information. However, if the information is not stored in the address book, the control unit 130 may control the network interface unit 150 to attempt to connect to the destination.

The control unit 130 may control the network interface unit 150 to attempt to connect to the destination by using each of the wired and wireless network interfaces 151 and 152. Then, the determination unit 120 may determine a network interface connectable to the destination from among the wired and wireless network interfaces 151 and 152 according to a result of the attempt using each of the wired and wireless network interfaces 151 and 152. In more detail, the control unit 130 may control the network interface unit 150 to attempt to connect to the destination by transmitting a request message to check a connection status from each of the wired and wireless network interfaces 151 and 152 to the destination, and the determination unit 120 may determine a network interface that receives a reply message to respond to the request message from the destination as the connectable network interface.

According to an embodiment of a way to attempt connecting, the control unit 130 may control the network interface unit 150 to attempt to connect to the destination by transmitting the request message from each of the wired and wireless network interfaces 151 and 152 to the destination in a transmission control protocol (TCP)-based network, and the determination unit 120 may determine a network interface that receives the reply message from the destination as the connectable network interface. Here, a TCP refers to a type of standard for specifying communication methods between a network and a network interface. That is, the type and the order of information to be transmitted are specified in the standard and thus the wired and wireless network interfaces 151 and 152 may communicate according to procedures or signals defined by the TCP.

Each of the wired and wireless network interfaces 151 and 152 may transmit a sequence number SYN to the destination together with the request message. For example, if the wired network interface 151 is connected to the destination and the wireless network interface 152 is not connected to the destination, the destination may transmit to the wired network interface 151 a reply message ACK to respond to the request message and the sequence number SYN transmitted from the wired network interface 151. However, since the wireless network interface 152 is not connected to the destination, the destination may not transmit the reply message ACK to the wireless network interface 152. The wired network interface 151 receiving the reply message ACK may transmit the reply message ACK back to the destination so as to represent that the reply message ACK has been successfully received. After the wired network interface 151 completely transmits the reply message ACK back to the destination, the wired network interface 151 is connected to and may communicate with the destination. The above procedure in the TCP-based network generally corresponds to a 3-way handshake. When the wireless network interface 152 is connected to the destination, the same procedure may be performed.

As described above, the control unit 130 may control the network interface unit 150 to attempt to connect to the destination according to the TCP, and the determination unit 120 may determine a network interface that has been successfully connected to the destination according to the TCP as the connectable network interface.

According to another embodiment of another way to attempt connecting, the control unit 130 may control the network interface unit 150 to attempt to connect to the destination by transmitting an Internet control message protocol (ICMP) request message from each of the wired and wireless network interfaces 151 and 152, and the determination unit 120 may determine a network interface that receives an ICMP reply message from the destination as the connectable network interface.

In more detail, each of the wired and wireless network interfaces 151 and 152 may transmit the ICMP request message to the destination so as to check a connection status. If a network interface connectable to the destination exists, the destination may transmit the ICMP reply message to the connectable network interface. For example, if the wired network interface 151 is connected to the destination and the wireless network interface 152 is not connected to the destination, the ICMP request message transmitted from the wired network interface 151 may reach the destination but the ICMP request message transmitted from the wireless network interface 152 may not reach the destination. As a result, the destination may transmit the ICMP reply message only to the wired network interface 151. After that, the wired network interface 151 is connected to and may communicate with the destination. When the wireless network interface 152 is connected to the destination, the same procedure may be performed.

As described above, the control unit 130 may control the network interface unit 150 to attempt to connect to the destination by transmitting the ICMP request message from each of the wired and wireless network interfaces 151 and 152 to the destination, and the determination unit 120 may determine a network interface that receives the ICMP reply message as the connectable network interface.

The storage unit 140 may store data including the job data and may also store the address book. In more detail, if the user interface unit 100 receives the destination address directly from the user, the storage unit 140 may update the address book by mapping information regarding the connectable network interface to the destination address, and may store the updated address book.

For example, if the user selects 'scan to FTP' on the user interface unit 100 and selects '192.168.2.12' as an address of an FTP server, the determination unit 120 may determine the wired network interface 151 as a network interface connectable to the FTP server. As such, the storage unit 140 may update the address book by mapping information regarding the wired network interface 151 to '192.168.2.12', i.e., the address of the FTP server, as the destination address, and may store the updated address book. The information regarding the wired network interface 151 may includes, for example, the MAC address and the IP address of the wired network interface 151.

The address book stored in the storage unit 140 may be displayed on the user interface unit 100 so that the user may check the address book to select the destination address.

Also, the control unit 130 may control the network interface unit 150 to transmit the job data to the destination by using the connectable network interface determined by the determination unit 120. That is, the control unit 130 may control operations of the wired and wireless network interfaces 151 and 152 included in the network interface unit 150.

Furthermore, the control unit 130 may also control operations of the user interface unit 100, the detection unit 110, the determination unit 120, the storage unit 140, the image forming unit 160, the fax unit 170 and the transmission function execution unit 180 included in the image forming apparatus 10.

The user interface unit 100 may display a result representing whether a connectable network interface exists or not, which may be determined by the determination unit 120. That is, a result representing that the connectable network interface exists or a result representing that the connectable network interface does not exist is displayed.

Figure 9:
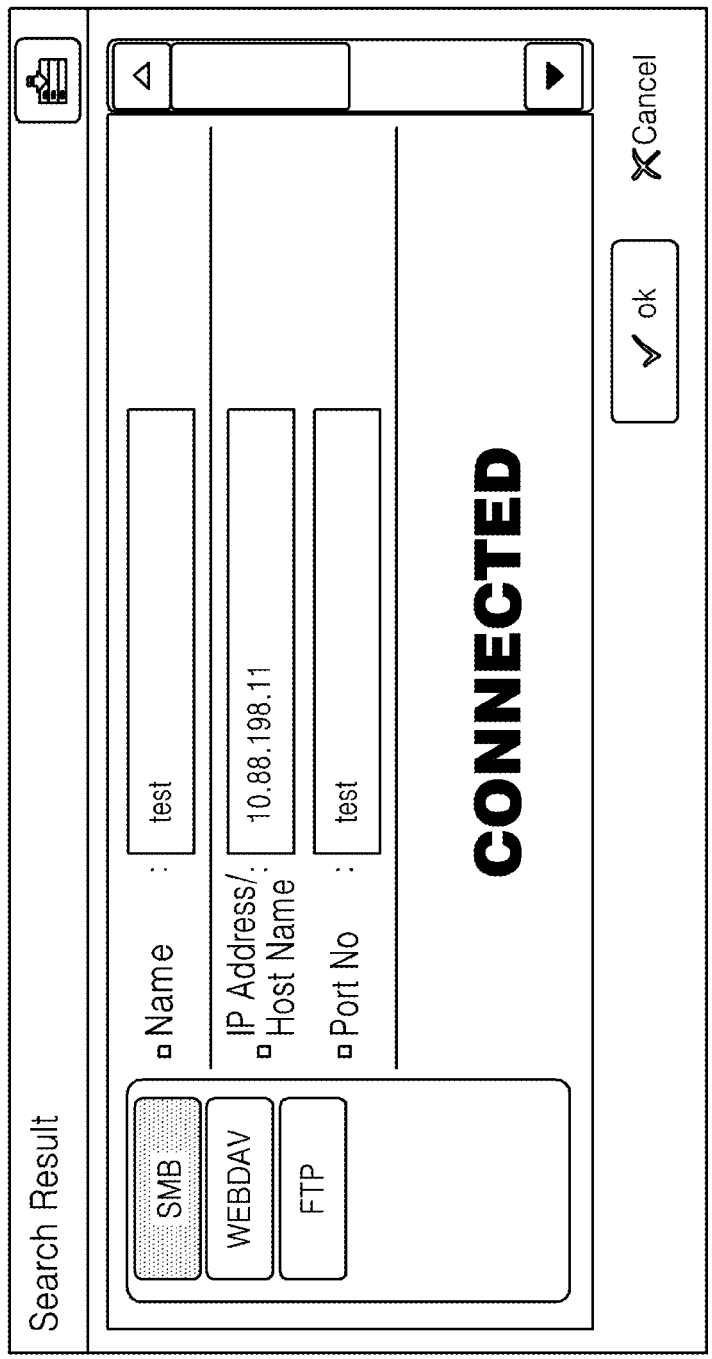
FIG. 9 is an image of a display screen of a user interface unit of the image forming apparatus illustrated in FIG. 2, according to another embodiment of the present general inventive concept.

FIG. 9 is an image of a display screen of the user interface unit 100 illustrated in FIG. 2, according to another embodiment of the present general inventive concept.

Referring to FIG. 9, a connection result of a network interface is displayed on the user interface unit 100. After attempting to connect to a destination corresponding to a destination address in order to transmit job data to an SMB server having an IP address of '10.88.198.11', the user interface unit 100 may display that a network interface is 'CONNECTED' when a connectable network interface exists.

In order to display the result, the user interface unit 100 may use a device to provide visual information such as a display device, a liquid crystal display (LCD) screen, a light-emitting diode (LED) or a division display device, a device to provide auditory information such as a speaker, etc.

Figure 3A:
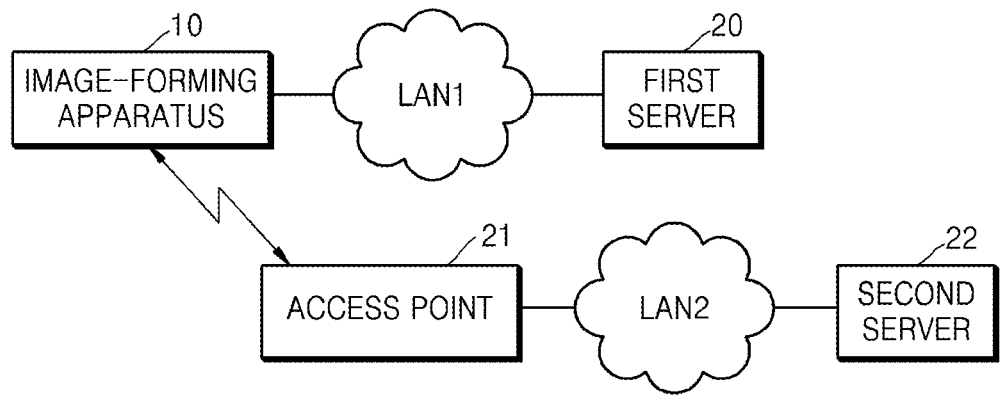
FIGS. 3A and 3B are diagrams illustrating a network connection method of the image forming apparatus illustrated in FIG. 2, according to an embodiment of the present general inventive concept.
Figure 3B:
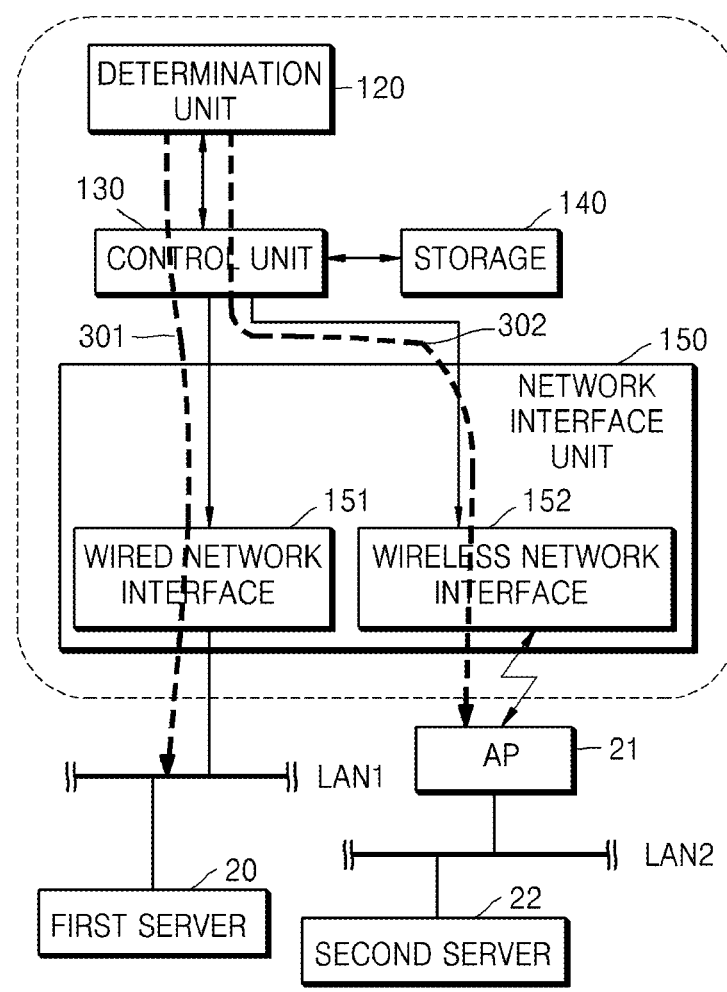

FIGS. 3A and 3B are diagrams illustrating a network connection method of the image forming apparatus 10 illustrated in FIG. 2, according to an embodiment of the present general inventive concept. FIGS. 3A and 3B will be described in conjunction with FIG. 2.

Referring to FIG. 3A, the image-forming apparatus 10 may be connected via a wire to LAN1, which is in turn connected to a first server 20. The image-forming apparatus 10 may be wirelessly connected to the wireless LAN2 via the access point 21. The wireless LAN2 may be in turn connected to a second server 22. The networks LAN1 and LAN2 may include one or more servers, host devices, or other external devices, which may include personal computers, notebook computers, printers, fax machines, scanners, or other devices. Either network may include one or more wired or wireless ports or terminals. As illustrated in FIG. 3A, the wired LAN1 is connected via a wire to the image-forming apparatus 10, and the wireless LAN2 is wirelessly connected to the image-forming apparatus 10.

The first and second servers 20, 22 may communicate via a same communication protocol or via different communication protocols. For example, the first and second servers 20, 22 may communicate via the FTP communication protocol or the first server 20 may be an FTP server and the second server 22 may be an SMB server.

Referring to FIG. 3B, when a destination corresponding to a destination address received from a user is the first server 20 will now be described. The control unit 130 may operate the wired and wireless network interfaces 151 and 152. Then, the control unit 130 may control the wired network interface 151 to attempt to connect to the first server 20 (see dotted path 301) and may also control the wireless network interface 152 to attempt to connect to the first server 20. If the wired network interface 151 is connectable to the first server 20, the determination unit 120 may determine the wired network interface 151 as a network interface connectable to the first server 20. Secondly, a case when a destination corresponding to a destination address received from a user is the second server 22 will now be described. The control unit 130 may operate the wired and wireless network interfaces 151 and 152. Then, the control unit 130 may control the wired network interface 151 to attempt to connect to the second server 22 via the access point 21 and may also control the wireless network interface 152 to attempt to connect to the second server 22 via the access point 21 (see dotted path 302). If the wireless network interface 152 is connectable to the second server 22 via the access point 21, the determination unit 120 determines the wireless network interface 152 as a network interface connectable to the second server 22.

Figure 4A:
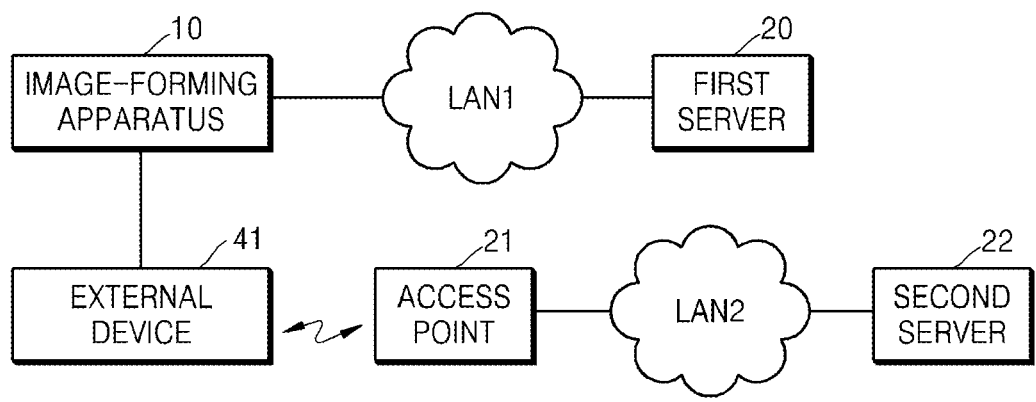

FIGS. 4A and 4B are diagrams illustrating a network connection method of an image forming apparatus 40 by using an external device 41, according to an embodiment of the present general inventive concept.

Referring to FIG. 4A, the image-forming apparatus 10 may be connected via a wire to LAN1, which is in turn connected to a first server 20. The image-forming apparatus 10 may be connected via a wire to the external device 41. The external device 41 may be a wireless module connectable via a port to the image-forming apparatus. The external device 41 may wirelessly connected to the wireless LAN2 via the access point 21. The wireless LAN2 may be in turn connected to a second server 22. The networks LAN1 and LAN2 may include one or more servers, host devices, or other external devices, which may include personal computers, notebook computers, printers, fax machines, scanners, or other devices. Either network may include one or more wired or wireless ports or terminals. As illustrated in FIG. 4A, the wired LAN1 is connected via a wire to the image-forming apparatus 10, and the wireless LAN2 is wirelessly connected to the image-forming apparatus 10 via the external device 41.

Referring to FIG. 4B, the current embodiment is different from the previous embodiments in relation to FIGS. 1 through 3B. The difference between the current embodiment and the previous embodiments is that the image forming apparatus 40 includes only a wired network interface 450 but supports both the wired network interface 450 and a wireless network interface 470 by using the external device 41. That is, at least one of the wired and wireless network interfaces 450 and 470 (e.g., the wireless network interface 470) may be included in the external device 41 separated from the image forming apparatus 40. Here, the external device 41 is a device that may include a network interface and may be mounted on a slot of the image forming apparatus 40 or may be connectable to a universal serial bus (USB) port of the image forming apparatus 40 by using a cable. The following descriptions will be provided on the assumption that the image forming apparatus 40 and the external device 41 are connected.

When the image forming apparatus 40 and the external device 41 are connected, the image forming apparatus 40 may support the wired and wireless network interfaces 450 and 470. If a destination corresponding to a destination address received from a user is a first server 20, a detection unit 400 may detect whether information regarding a network interface mapped to the first server 20 is stored in an address book stored in a storage 420. If the information is stored in the address book, a control unit 430 or 440 to control the network interface represented by the information may control the network interface to transmit job data to the destination, i.e., the first server 20.

However, if the information is not stored in the address book, the control unit 430 of the image forming apparatus 40 may operate the wired network interface 450 and the control unit 440 of the external device 41 may operate the wireless network interface 470, so as to attempt to connect to the destination. That is, the control unit 430 may control the wired network interface 450 to attempt to connect to the first server 20 (see dotted path 401) and the control unit 440 may control the wireless network interface 470 to attempt to connect to the first server 20.

If the wired network interface 450 is connectable to the first server 20, a determination unit 410 may determine the wired network interface 450 as a network interface connectable to the first server 20. The storage 420 may update the address book by mapping information regarding the wired network interface 450 to information regarding the first server 20, and may store the updated address book. After that, the control unit 440 of the external device 41 may terminate operation of the wireless network interface 470, the control unit 430 of the image forming apparatus 40 may operate the wired network interface 450, and the image forming apparatus 40 may be connected to the first server 20.

Likewise, if a destination corresponding to a destination address received from a user is a second server 22, the detection unit 400 may detect whether information regarding a network interface mapped to the second server 22 is stored in the address book stored in the storage 420. If the information is stored in the address book, the control unit 430 or 440 to control the network interface represented by the information may control the network interface to transmit job data to the destination, i.e., the second server 22.

However, if the information is not stored in the address book, the control unit 430 of the image forming apparatus 40 may operate the wired network interface 450 and the control unit 440 of the external device 41 may operate the wireless network interface 470, so as to attempt to connect to the destination. That is, the control unit 430 may control the wired network interface 450 to attempt to connect to the second server 22 via an access point 21 (see dotted path 402) and the control unit 440 may control the wireless network interface 470 to attempt to connect to the second server 22 via the access point 21.

If the wireless network interface 470 is connectable to the second server 22 via the access point 21, the determination unit 410 may determine the wireless network interface 470 as a network interface connectable to the second server 22. The storage 420 may update the address book by mapping information regarding the wireless network interface 470 to information regarding the second server 22, and may store the updated address book. After that, the control unit 430 of the image forming apparatus 40 may terminate operation of the wired network interface 450, the control unit 440 of the external device 41 may operate the wireless network interface 470, and the image forming apparatus 40 may be connected to the second server 22.

Referring back to FIG. 2, the image forming unit 160, the fax unit 170 and the transmission function execution unit 180 may perform various functions supported by the image forming apparatus 10. The image forming unit 160 may perform a printing operation of a document file transmitted from the host device. The fax unit 170 may perform a faxing operation of a document file transmitted from the host device. The transmission function execution unit 180 may perform a transmission operation of a document file transmitted from the host device to a server, a mobile storing medium, a computer system or the like in a network, if the network interface unit 150 is connected to the destination.

Figure 5A:
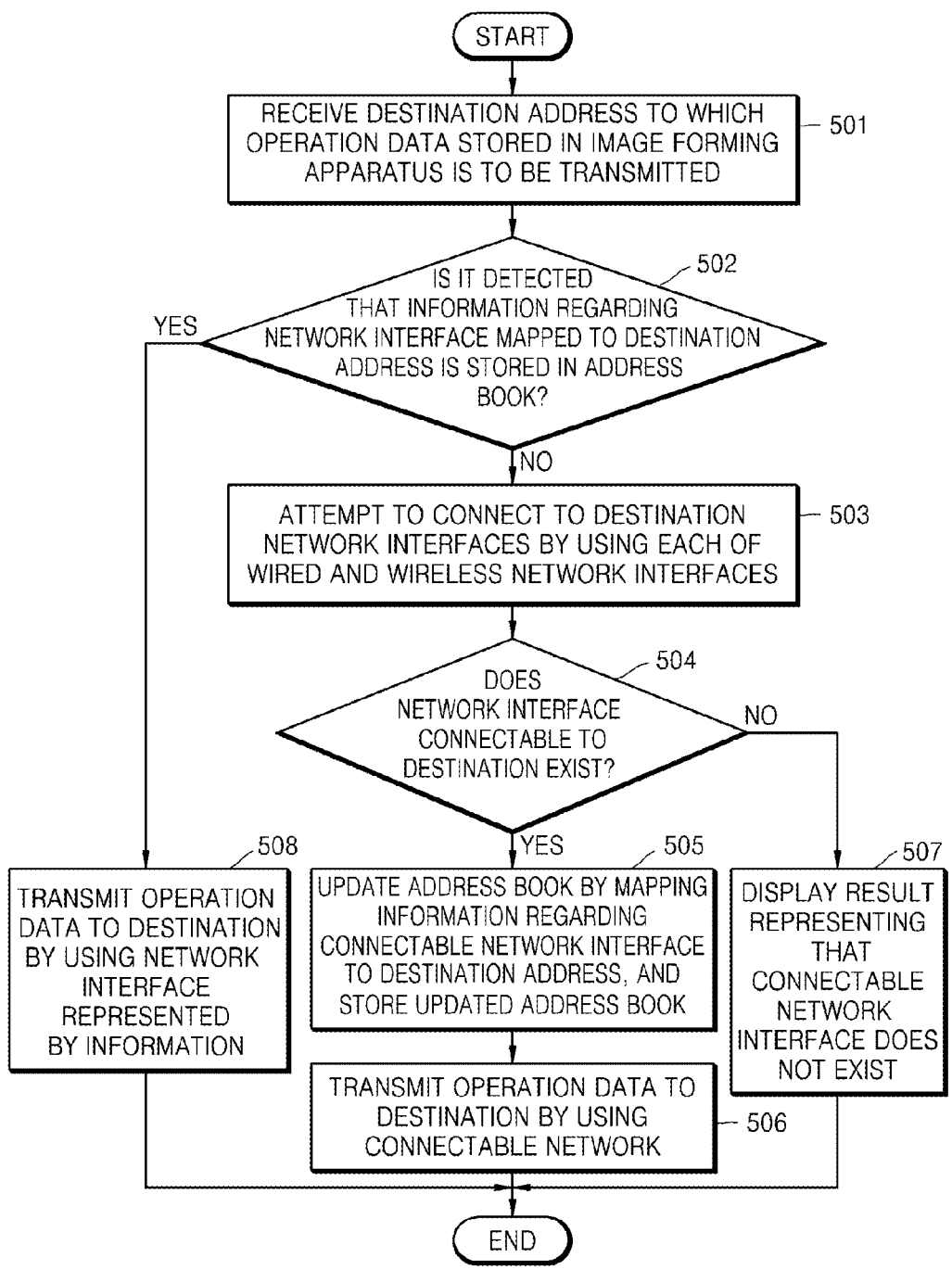
FIGS. 5A and 5B are flowcharts illustrating network connection methods of the image forming apparatus illustrated in FIG. 2, according to embodiments of the present general inventive concept.
Figure 5B:
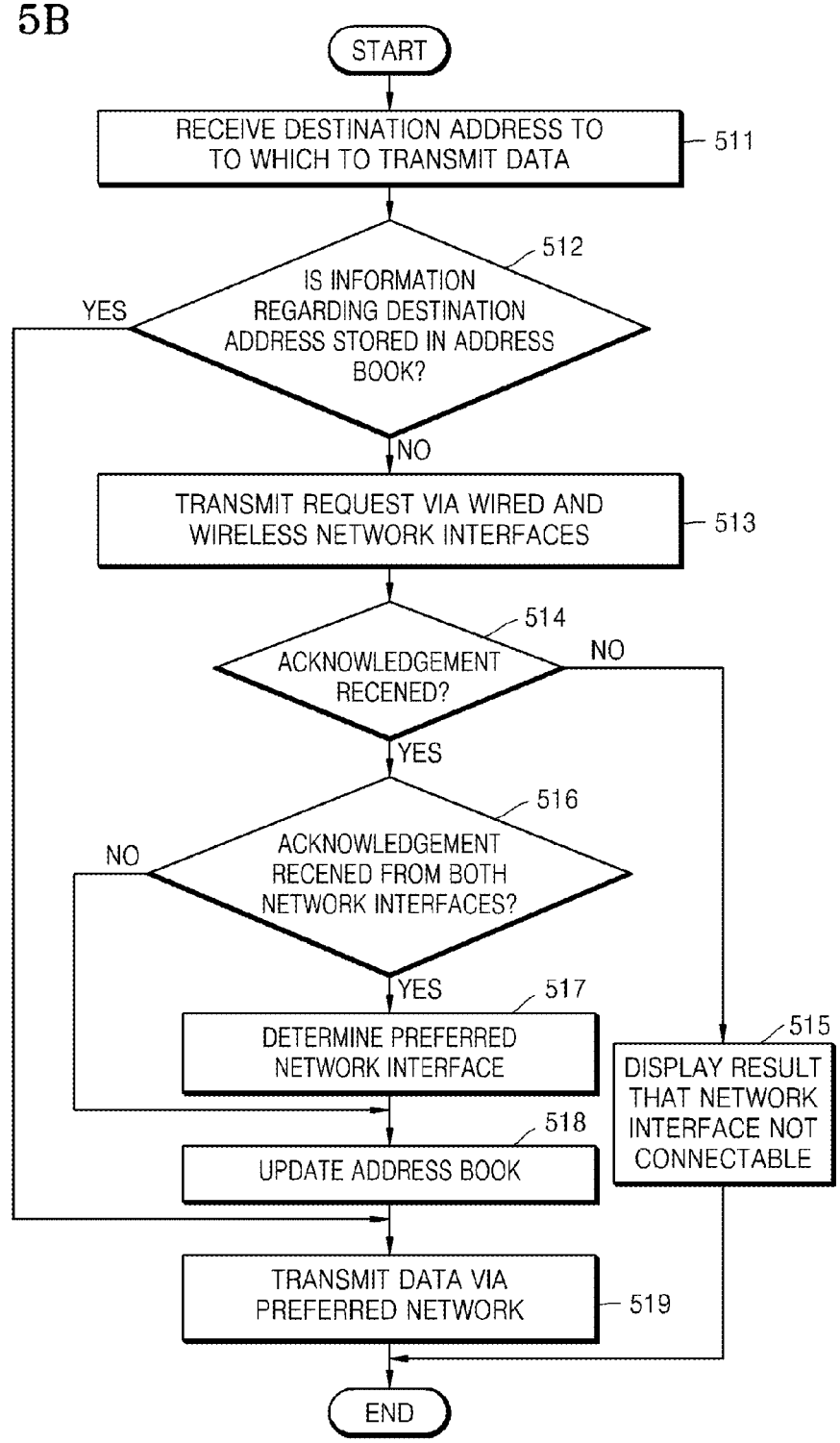

FIGS. 5A and 5B are flowcharts of network connection methods of the image forming apparatus 10 illustrated in FIG. 2, according to embodiments of the present general inventive concept.

The network connection method according to the current embodiment corresponds to a time serial process that may be performed by the image forming apparatus 10 and thus repeated descriptions may not be provided here. FIGS. 5A and 5B will be described in conjunction with FIG. 2.

Referring to FIG. 5A, in operation 501, the user interface unit 100 may receive from a user a destination address to which job data stored in the image forming apparatus 10 is to be transmitted. For example, a list of destinations such as 'scan to FTP', 'scan to SMB', 'scan to SMTP', 'scan to e-mail' and the like may be displayed on the user interface unit 100 and the user may select a destination from the list.

In operation 502, if the destination address is received from the user, before the control unit 130 controls the network interface unit 150 to attempt to connect to the destination, the detection unit 110 may detect whether information regarding a network interface mapped to the destination address is stored in the address book stored in the storage unit 140. If the information is stored in the address book, the network connection method may proceed to operation 508. However, if the information is not stored in the address book, the network connection method may proceed to operation 503.

In operation 508, the control unit 130 may control the network interface unit 150 to transmit the job data to the destination by using the network interface represented by the information stored in the address book.

In operation 503, the control unit 130 may control the network interface unit 150 to attempt to connect to the destination by using each of the wired and wireless network interfaces 151 and 152.

In operation 504, the determination unit 120 may determine whether a network interface connectable to the destination exists from among the wired and wireless network interfaces 151 and 152 according to a result of the attempt using each of the wired and wireless network interfaces 151 and 152. If a connectable network interface exists, the network connection method may proceed to operation 505. However, if the connectable network interface does not exist, the network connection method may proceed to operation 507.

In operation 507, the user interface unit 100 may display a result representing that the connectable network interface does not exist.

In operation 505, the storage unit 140 may store data including the job data and may also store the address book. In more detail, if the user interface unit 100 receives the destination address directly from the user, the storage unit 140 may update the address book by mapping information regarding the connectable network interface to the destination address, and may store the updated address book.

In operation 506, the control unit 130 may control the network interface unit 150 to transmit the job data to the destination by using the connectable network interface determined by the determination unit 120.

As described above, according to the present general inventive concept, if an image forming apparatus includes both wired and wireless network interfaces, a client of a destination to which job data stored in the image forming apparatus is to be transmitted may detect whether a network interface connectable to the destination exists from among the wired and wireless network interfaces and the job data may be transmitted to the client of the destination by using the connectable network interface.

FIG. 5B illustrates a network connection method similar to FIG. 5A. In operation 511, the user interface unit 100 may receive from a user a destination address to which job data stored in the image forming apparatus 10 is to be transmitted. Alternatively, a destination address may be pre-stored in the storage unit 140. In operation 512, it is determined whether a network interface mapped to the destination address is stored in the address book stored in the storage unit 140. If the information is stored in the address book, the network connection method may proceed to operation 519. However, if the information is not stored in the address book, the network connection method may proceed to operation 513.

In operation 513, the control unit 130 may control the network interface unit 150 to attempt to connect to the destination by using each of the wired and wireless network interfaces 151 and 152.

In operation 514, the determination unit 120 may determine whether one of the network interfaces 151 and 152 is connectable to the destination. If not, the user interface unit 100 of the image-forming apparatus 10 may display the determined result that neither network interface 151, 152 of the image-forming apparatus 10 is connectable to the destination. However, if it is determined that at least one of the network interfaces 151, 152 is connectable to the destination, then it may be determined in operation 516 whether each of the wired and wireless network interfaces 151 and 152 is connectable to the destination. For example, it may determined whether each of the first and second servers 20, 22 responds to a request to transmit.

If it is determined that only one of the wireless network interfaces 151, 152 is connectable to the destination, the image-forming apparatus 10 may proceed to operation 518. However, if both network interfaces 151, 152 are connectable to the destination, the determination unit 120 may analyze data from the wired network interface 151 and the wireless network interface 152 to determine which is the preferred network in operation 517. For example, the determination unit 120 may determine whether a pre-programmed setting of the image-forming apparatus prefers one network over the other, or may analyze a network connection speed, traffic load, connection strength, or any other characteristic to determine which network is preferred.

Once the preferred network interface is determined in operation 517, the address book stored in the storage unit 140 may be updated in operation 518, and the data may be transmitted to the destination in operation 519.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A network connection method of an image forming apparatus to support wired and wireless network interfaces connectable to an external device, the method comprising:
    receiving a destination address to which job data stored in the image forming apparatus is to be transmitted;
    attempting to connect to a destination corresponding to the destination address by using each of the wired and wireless network interfaces, the wired and wireless network interfaces having different addresses;
    determining a network interface connectable to the destination, according to a result of the attempt; and
    transmitting the job data to the destination by using the connectable network interface.

2. The network connection method of claim 1, wherein the job data is data scanned by the image forming apparatus or data previously stored in the image forming apparatus, and
    the stored data is printing data, fax data, e-mail data, or transmission data transmitted from a host device connected to the image forming apparatus.

3. The network connection method of claim 1, wherein the receiving comprises receiving the destination address directly or by using an address book including information regarding a network interface mapped to the destination address, and
    the transmitting comprises transmitting the job data by using the network interface mapped to the destination address if the destination address is received by using the address book.

4. The network connection method of claim 3, wherein, if the destination address is received directly, the method further comprises:
    updating the address book by mapping information regarding the connectable network interface to the destination address; and
    storing the updated address book.

5. The network connection method of claim 1, wherein the wired network interface or the wireless network interface is located in the external device.

6. The network connection method of claim 1, further comprising displaying a result representing whether a connectable network interface exists.

7. The network connection method of claim 1, wherein the destination address comprises at least one selected from the group of a file transfer protocol (FTP) server address, a server message block (SMB) server address, an e-mail address and an Internet protocol (IP) address.

8. A network connection method of an image forming apparatus to support wired and wireless network interfaces connectable to an external device, the method comprising:
    receiving a destination address to which job data stored in the image forming apparatus is to be transmitted;
    attempting to connect to a destination corresponding to the destination address by transmitting a request message to check a connection status from each of the wired and wireless network interfaces to the destination, and
    determining a network interface that receives a reply message to respond to the request message from the destination as a network interface connectable to the destination; and
    transmitting the job data to the destination by using the connectable network interface.

9. The network connection method of claim 8, wherein each of the request message and the reply message corresponds to at least one of an Internet control message protocol (ICMP) message and a message transmitted in a transmission control protocol (TCP)-based network.

10. A non-transitory computer readable recording medium having recorded thereon a computer program to execute a network connection method of an image forming apparatus to support wired and wireless network interfaces connectable to an external device, the method comprising:
    receiving a destination address to which job data stored in the image forming apparatus is to be transmitted;
    attempting to connect to a destination corresponding to the destination address by transmitting a request message to check a connection status from each of the wired and wireless network interfaces to the destination;
    determining a network interface that receives a reply message to respond to the request message from the destination as a network interface connectable to the destination; and
    transmitting the job data to the destination by using the connectable network interface.

11. An image forming apparatus to support wired and wireless network interfaces connectable to an external device, the image forming apparatus comprising:
    a user interface unit to receive a destination address to which job data stored in the image forming apparatus is to be transmitted;
    a network interface unit comprising at least one of wired and wireless network interfaces, the wired and wireless network interfaces having different addresses;
    a control unit to control the network interface unit to attempt to connect to a destination corresponding to the destination address by using each of the wired and wireless network interfaces;
    a determination unit to determine a network interface connectable to the destination, according to a result of the attempt; and
    a storage to store data including the job data,
    wherein the control unit controls the network interface unit to transmit the job data to the destination by using the connectable network interface.

12. The image forming apparatus of claim 11, wherein the job data is data scanned by the image forming apparatus or data previously stored in the image forming apparatus, and
    the stored data is printing data, fax data, e-mail data, or transmission data transmitted from a host device connected to the image forming apparatus.

13. The image forming apparatus of claim 11, wherein the user interface unit receives the destination address directly or by using an address book stored in the storage and including information regarding a network interface mapped to the destination address, and the control unit controls the network interface unit to transmit the job data by using the network interface mapped to the destination address if the user interface unit receives the destination address by using the address book.

14. The image forming apparatus of claim 13, wherein, if the user interface unit receives the destination address directly, the storage updates the address book stored in the storage by mapping information regarding the connectable network interface to the destination address, and stores the updated address book.

15. The image forming apparatus of claim 11, wherein the wired and wireless network interfaces are located on one network board.

16. An image forming apparatus to support wired and wireless network interfaces connectable to an external device, the image forming apparatus comprising:
    a user interface unit to receive a destination address to which job data stored in the image forming apparatus is to be transmitted;
    a network interface unit comprising at least one of wired and wireless network interfaces;
    a control unit to control the network interface unit to attempt to connect to a destination corresponding to the destination address by transmitting a request message to check a connection status from each of the wired and wireless network interfaces to the destination, and
    a determination unit to determine a network interface that receives a reply message to respond to the request message from the destination as a network interface connectable to the destination; and
    a storage to store data including the job data,
    wherein the control unit controls the network interface unit to transmit the job data to the destination by using the connectable network interface.

17. The image forming apparatus of claim 11, wherein the wired network interface or the wireless network interface is located in the external device.

18. The image forming apparatus of claim 11, wherein the user interface unit displays a result representing whether a connectable network interface exists.

19. A network connection method, comprising:
    receiving a command at an image forming apparatus to transmit data to a destination address;
    querying the destination address via at least two network interfaces;
    determining whether the at least two network interfaces received acknowledgements to the query;
    upon receiving an acknowledgement to the query via at least one of the network interfaces, determining a preferred network interface of the at least two network interfaces to transmit the data; and
    transmitting the data via the preferred network interface.

20. The network connection method according to claim 19, wherein a first network interface of the at least two network interfaces is a wired network interface, and
    a second network interface of the at least two network interfaces is a wireless network interface.

21. The network connection method according to claim 19, wherein determining a preferred network interface includes comparing network characteristics of respective networks connecting the at least two network interfaces to the destination address.

22. The network connection method according to claim 19, further comprising:
    storing mapping information regarding a network connecting the at least one network interface having received the acknowledgement and the destination address.

23. The network connection method according to claim 19, further comprising:
    upon receiving the command to transmit data, determining whether mapping information of a network connected to the destination address is stored in the image forming apparatus.

24. An image forming apparatus, comprising:
    at least two network interfaces, each connectable to a separate network external to the image forming apparatus;
    a controller to receive a command to transmit data to a destination address, to transmit a query corresponding to the destination address via each of the at least two network interfaces, and to control a first network interface of the at least two network interfaces to transmit the data to the destination address when an acknowledgement is received corresponding to the destination address via the first network interface; and
    a determination unit controllable by the control unit to determine whether one of the at least two network interfaces has received an acknowledgement,
    wherein the determination unit determines whether each of the at least two network interfaces has received an acknowledgement in response to a query and determines a preferred network interface of the at least two network interfaces.

25. The image forming apparatus according to claim 24, wherein at least one of the network interfaces is a wired network interface and at least another of the network interfaces is a wireless network interface.

26. The image forming apparatus according to claim 24, further comprising:
    a user interface to receive the command to transmit data to the destination address.

27. The image forming apparatus according to claim 24, wherein the determination unit determines a preferred network by analyzing at least one network characteristic.

28. An image forming system, comprising:
    a first network including at least a first network server;
    a second network including at least a second network server and a wireless access point; and
    an image forming apparatus connected to the first network via a wired connection and wirelessly connected to the second via the wireless access point, the image forming apparatus comprising:
    a first network interface connected to the first network;
    a second network interface connected to the second network; and
    a controller to receive a command to transmit data to a destination address, to transmit a query corresponding to the destination address via each of the network interfaces, and to control one of the first and second network interfaces to transmit the data to the destination address when an acknowledgement is received corresponding to the destination address via one of the first and second network interfaces.

\* \* \* \* \*